A. E. MERKEL & R. E. DUNHAM.
LAWN ROLLER.
APPLICATION FILED APR. 20, 1914.

1,120,515.

Patented Dec. 8, 1914.

Witnesses:

Inventors:
Arthur E. Merkel &
Ray E. Dunham,
by A. E. Merkel,
their Attorney

UNITED STATES PATENT OFFICE.

ARTHUR E. MERKEL, OF CLEVELAND, AND RAY E. DUNHAM, OF BEREA, OHIO, ASSIGNORS TO THE DUNHAM COMPANY, OF BEREA, OHIO, A CORPORATION OF OHIO.

LAWN-ROLLER.

1,120,515.   Specification of Letters Patent.   Patented Dec. 8, 1914.

Application filed April 20, 1914. Serial No. 833,250.

*To all whom it may concern:*

Be it known that we, ARTHUR E. MERKEL and RAY E. DUNHAM, citizens of the United States, residents, respectively, of Cleveland, county of Cuyahoga, and State of Ohio, and Berea, county of Cuyahoga, and State of Ohio, have invented a new and useful Improvement in Lawn-Rollers, of which the following is a specification, the principle of the invention being herein explained and the best mode in which we have contemplated applying that principle, so as to distinguish it from other inventions.

Our invention relates to lawn-rollers, its object being to provide a lawn-roller which will be economical of construction and efficient in its operation.

Said invention consists of means hereinafter fully described and particularly set forth in the claims.

The annexed drawing and the following description set forth in detail certain means embodying our invention, the disclosed means, however, constituting but one of various mechanical forms in which the principle of the invention may be applied.

Figure 1:
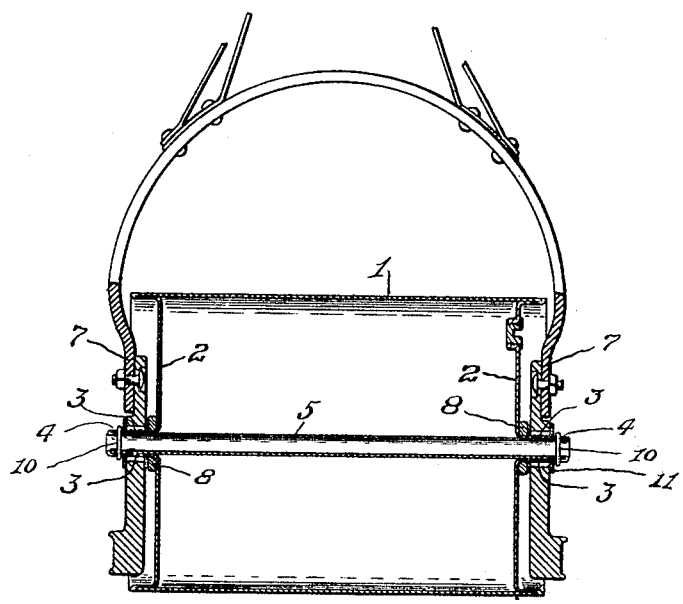
Figure 2:
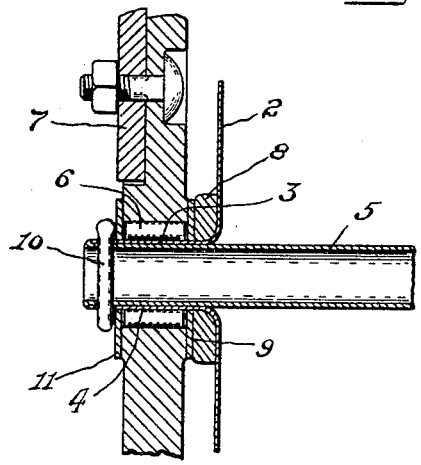
Figure 3:
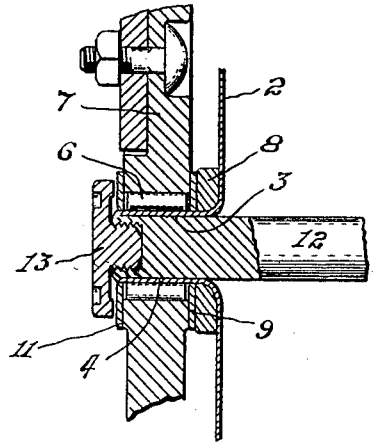

In said annexed drawing:—Figure 1 represents a vertical axial section of a lawn-roller embodying our invention. Fig. 2 represents a vertical axial section of a fragmentary portion of the lawn-roller and illustrating the parts embodying our invention. Fig. 3 represents a view similar to that of Fig. 2 and illustrating a modified form of our invention.

The illustrated embodiment of our invention, referring first to the structure illustrated by Fig. 2, comprises a cylindrical drum 1 provided with end heads 2, each of which latter is formed with a central opening 3 surrounded by an outwardly extending flange 4. Extending through these openings into these flanges and having its outer ends welded to the outer ends of the flanges respectively, is a tubular axle 5. These flanges form journals for roller bearings 6 of handle 7. Interposed between the inner faces of each bearing part of the handle is a washer 8 formed so as to snugly fit the curved surfaces at the junction of the head and flange, as shown in Fig. 2, and a thinner washer 9. The flanges 4 are made of a length sufficient to permit of the use of a cotter-pin 10 passing through the outer ends thereof, and an intermediate washer 11 adapted to retain the rollers of the roller bearing 6 in place, as will be readily understood.

In the device illustrated by Fig. 3, a solid bar 12 is substituted for the axle tube 5, the ends of the bar being drilled into tubular form, as shown, and the extreme end portions being welded to the ends of the flanges as in the case of the first described device.

Instead of employing the cotter-pin 10, shown in Fig. 2, each tubular end portion of the axle rod or bar 12 may be internally threaded and a cap 13 screwed therein to retain the washers 11 in place, as will be readily understood.

Having fully described our invention, what we claim and desire to secure by Letters Patent is:—

1. In a lawn-roller, the combination of a drum having end heads each provided with a central opening and an outwardly extending flange surrounding such opening; an axle extending into and secured to said flanges; and a handle having bearings mounted upon said flanges respectively.

2. In a lawn-roller, the combination of a drum having end heads each provided with a central opening and an outwardly extending flange surrounding such opening; an axle extending into and welded to said flanges; and a handle having bearings mounted upon said flanges respectively.

3. In a lawn-roller, the combination of a drum having end heads each provided with a central opening surrounded by an outwardly extending flange; an axle extending into said openings and having its ends secured to the outer ends of said flanges respectively; and a handle having bearings mounted upon said flanges respectively.

4. In a lawn-roller, the combination of a drum having end heads each provided with a central opening surrounded by an outwardly extending flange; an axle extending into said openings and having its ends welded to the outer ends of said flanges respectively; and a handle having bearings mounted upon said flanges respectively.

5. In a lawn-roller, the combination of a drum having end heads each provided with a central opening surrounded by an outwardly extending flange; an axle having its end portions tubular and extending into said openings, the extremities of said end portions being welded to the ends of said flanges respectively; and bearings mounted upon said flanges respectively.

Signed by me, this 16th day of April, 1914.

ARTHUR E. MERKEL.

Attested by—
HERMAN EISELE,
D. FINDLING.

Signed by me, this 16th day of April, 1914.

RAY E. DUNHAM.

Attested by—
J. R. DUNHAM,
A. F. EHRBAR.

Copies of this patent may be obtained for five cents each, by addressing the "Commissioner of Patents, Washington, D. C."